United States Patent
Burke et al.

(10) Patent No.: US 6,193,141 B1
(45) Date of Patent: Feb. 27, 2001

(54) SINGLE CRYSTAL TURBINE COMPONENTS MADE USING A MOVING ZONE TRANSIENT LIQUID PHASE BONDED SANDWICH CONSTRUCTION

(75) Inventors: Michael A. Burke, Pittsburgh, PA (US); Paul J. Zombo, Cocoa, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/558,131

(22) Filed: Apr. 25, 2000

(51) Int. Cl.$^7$ .................. B23K 31/02; B23K 35/12; B21K 25/00; B23P 15/02; B21D 53/78
(52) U.S. Cl. ............... 228/190; 228/225; 228/234.1; 228/252; 228/262.3; 29/889.2; 29/889.7; 416/241 R; 416/213 R
(58) Field of Search ................... 228/190, 225, 228/234.1, 252, 262.3, 51; 29/889.2, 889.7; 416/241 R, 213 R (56) References Cited

U.S. PATENT DOCUMENTS

| | | |
|---|---|---|
| 2,813,048 | 11/1957 | Pfann . |
| 4,039,330 | 8/1977 | Shaw . |
| 4,203,706 | 5/1980 | Hess . |
| 4,208,222 | 6/1980 | Barlow et al. . |
| 4,250,229 | * 2/1981 | Kear et al. .............. 428/606 |
| 4,499,155 | * 2/1985 | Holiday et al. .......... 428/586 |
| 4,637,448 | 1/1987 | Burke et al. . |
| 4,643,782 | 2/1987 | Harris et al. . |
| 4,700,881 | 10/1987 | Ryan . |
| 4,802,828 | * 2/1989 | Rutz et al. ............. 416/241 |
| 5,038,996 | * 8/1991 | Wilcox et al. .......... 228/121 |
| 5,061,154 | 10/1991 | Kington . |
| 5,298,470 | * 3/1994 | Chia et al. ............. 501/89 |
| 5,395,584 | * 3/1995 | Berger et al. .......... 420/443 |
| 5,540,790 | 7/1996 | Erickson . |
| 5,836,075 | 11/1998 | Fitzgerald et al. . |
| 5,846,057 | * 12/1998 | Ferrigno et al. ........ 416/241 |
| 5,958,204 | * 9/1999 | Creech et al. .......... 204/487 |
| 6,087,021 | * 7/2000 | Gaynes et al. .......... 428/546 |
| 6,098,871 | * 8/2000 | Cairo et al. ........... 228/194 |

FOREIGN PATENT DOCUMENTS

WO 99/21680    5/1999   (WO) .

OTHER PUBLICATIONS

Anderson, R. E. et al, "Use of RSR Alloys for High Performance Turbine Airfoils", Proceedings of the Second International Conference on Rapid Solidification Processes, 1980, pp. 416–428.

* cited by examiner

Primary Examiner—Patrick Ryan
Assistant Examiner—Colleen Cooke (57) ABSTRACT

A method of bonding together at least two long, metal alloy segments, of turbine components, such as turbine blade segments (18, 19, 20 and 21) by: putting a melting point depressant between the segments at bond planes (34) between contracting segments; forming a heated zone across the segments and a heated front (32); where melt pools (36) form in a molten zone (38) at the heated front which front (32), pools (36) and zone (38) continuously move and pass along the bond planes (34); where crystal re-growth (35) occurs along the bonding planes to form bonds (34) between the individual segments (18, 19, 20 and 21) behind the moving molten zone (38).

16 Claims, 4 Drawing Sheets

SINGLE CRYSTAL TURBINE COMPONENTS MADE USING A MOVING ZONE TRANSIENT LIQUID PHASE BONDED SANDWICH CONSTRUCTION

BACKGROUND OF THE INVENTION

1. Field of the Invention

This invention relates to a method of manufacturing turbine blades, vanes and other turbine components by joining single crystal sections together using a moving zone transient liquid phase bonded (MZTLPB) sandwich construction.

2. Background Information

State-of-the art blades and vanes that are employed in modern, high efficiency power generation combustion turbine engines rely on high quality materials and precise control of the part's internal and external dimensions. Because of the large size of these parts, cost-effective manufacturing is being pursued by several routes. High quality materials have been provided by using single crystal alloys fabricated, for example, as taught by Burke et al. in U.S. Pat. No. 4,637,448. The high performance properties of single crystal alloys are required in the complex cooled structure blades that are to be used for the first and second rows of advanced turbine systems "ATS" and subsequent generation gas turbines. It is difficult, however to incorporate complex cooling channels in the large size land based turbine blade castings without impairing the single crystal quality of the blades. The consequence of these technical difficulties is low yields of castings of high performance single crystals or the need to turn to lower performance SC alloys that may be cast with higher yields.

The concept of fabricating blades from axial planar sections has been identified previously by R. E. Anderson et al. in "Use of RSR Alloys for High Performance Turbine Airfoils", Proceedings of the Second International Conference of on Rapid Solidification Processes, 1980, pp. 416–428. In this concept, highly deformed (rolled) polycrystalline sheets were machined into the shapes of axial section of a blade and were subsequently diffusion brazed together. The excess energy of the surfaces of the thin sheets and the stored energy of the rolled structure provided the driving force for a solid state recrystallization to form a single crystal structure. In this process many thin sections are required to form a blade and each one must be individually machined, especially if internal cooling passages are required, to build up the structure of a blade, adding to costs. Also, the crystallographic texture developed by the solid state recrystallization process may not be as strong or as optimally aligned as the pure <001> single crystals that are developed by casting. In particular, secondary axis orientation cannot be controlled during solid state recrystallization. This process involved solid sate recrystallization of very thin, deformed sheets of nickel base superalloy. Turbine blades having a radial wafer airfoil construction are also shown in U.S. Pat. No. 4,203,706 (Hess). Kingston, in U.S. Pat. No. 5,061,154, also taught joining a plurality of cast single crystal blade segments. Here they were joined by hot isostatic pressing.

Burke et al., in PCT Application No. WO 99/21680, taught making turbine blades made from multiple single crystal, cast, nickel based, superalloy segments joined by a transient liquid phase bonding technique followed by a controlled heat treatment, to produce the desired microstructure in the bond region. Useful known single crystal materials included, for example, a CMSX-4 alloy of Ni with Cr, Co, Al, Ti, Mo, Ta, W, Re and Hf. Boron rich bonding foils, for example, 9 wt % Cr, 8 wt % Co, 4 wt % W, 4 wt % Ta, 1 wt % Hf, 2 wt % Al, 3 wt % B, with the remainder Ni, were used along the entire bonding area for rapid solid state diffusion into the blade segments during bonding, since boron is a meeting point depressant. The bonding process was conducted at a temperature above the melting point of the foil but below the bulk melting point of the blade segments. As the boron rich foil melts, it wets the base material on either side of the bond along the entire bond area, as a single static melt pool, causing some dissolution and a wider liquid zone, lowering the concentration of boron at the same time that solid state diffusion also causes boron loss from the pool environs, allowing resolidification at the centerline of the bond. Potential problems here are a long single molten zone along the entire bonding edge of the blade segment, which is difficult to control. Also, the foils can exhibit limited ductility such that they are difficult to cut into the precise shapes that are necessary to conform to the component surfaces to which they are applied for bonding.

Ryan, in U.S. Pat. No. 4,700,881, improved the transit liquid phase process of bonding turbine engine components together and solved problems of too rapid boron diffusion in fine grained materials by using multiple foils with different amounts of melting point depressants in different layers. The layers are all in place in the same bond gap and all melt at the same time to provide static melt pools all adjacent to each other. In U.S. Pat. No. 4,208,222 (Barlow et al.), the bond material for transient liquid phase bonding of turbine blades is made of a borided portion of a metallic coating on one of the surface to be bonded, providing a boron rich surface for preferential melting. This aids the resolidification process since the molten outer surfaces of the foil better wet the blade section before full melting of the bond foil. Again this provides a static melt pool.

Fitzgerald et al., in U.S. Pat. No. 5,836,075, solved bond foil problem by sputter depositing bonding material on selected opposed mating surfaces of turbine segments to be bonded together, providing well defined and constrained local melting regions, and then bonding the entire bonding edge of the turbine segments by a transient liquid phase bonding technique. This still results in a single, one step melting process, where all portions of the foil are melted at the same time. This can be disadvantageous, because a large molten pool is formed by the large layer of bond material when it is held at a uniform temperature. Because of the large mass of the zone, there is a tendency for the pool to agglomerate in one region, thereby causing excessive local melting and loss of local shape control.

Pfann, in U.S. Pat. No. 2,813,048, taught a zone melting process where a molten region is caused to travel through a body of material while operating at a temperature below the melting point of the body. This involved moving a molten zone, where all the material heated in that zone was in the liquid state, within a solid body toward a region of higher temperature. This resulted however, in cylindrical zones and resultant round solidified solid tubes caused by surface tension of the liquid. This was used to manufacture semiconductors. A liquid-solid interface was always present normal (perpendicular) to the direction of progression of the interface and yielded a high purity, controlled crystal structure. While even quite large diameter materials can be grown in solid sections (that is, greater than 6 inch—15.25 cm—diameter solid tubes in silicon for semiconductors), maintaining internal orifices, such as cooling passages, in a turbine blade would be impossible if a molten zone was passed along a long conventional turbine blade material.

What would be needed would be some way to keep separate molten zones from agglomerating. Although a potential answer might be to use internal cores the difficulties of using such a process are expected to be very severe.

There is a need for more cost effective, higher yield processing of single crystal materials. Current casting difficulties on the part of casting vendors causes prices to rise, complex structures are not guaranteed and choices of alloys are restricted to the easier to cast but lower performance SC alloys. One of the problems in the conventional casting industry is that the only time that the product can be inspected for material quality is at the end of the process. Because a considerable fraction of the cost of manufacturing single crystal parts is in the cost of the mold, the cores etc, a great deal of unrecoverable costs are expended before the process "sees metal". Since mold and core problems can also affect parts shape that cannot be discovered until after the part has been fully cast, the conventional casting approach has no way to eliminate unproductive costs by eliminating scrap parts in mid process. A method that would separate the production of single crystal quality and component geometry would be able to reduce costs by inserting intermediate inspection and eliminating unproductive processing of defective materials.

Therefore, what is needed is a new and improved method of bonding single crystal turbine component segments that will allow better control of the bonding process and allow bonding of complex, precise internal surfaces of the turbine component segments.

SUMMARY OF THE INVENTION

Therefore it is a main object of this invention to provide controlled bonding of complex, precise internal surfaces of turbine component segments.

These and other objects of the invention are accomplished by providing a method of bonding together at least two long, metal alloy segments, of turbine components, such as turbine blade segments by: putting a melting point depressant between long metal alloy segments at bond planes between contracting segments; forming a heated zone and a heated front across the segments; forming melt pools and a molten zone at the heated front; continuously moving the heated front, melt pools and molten zone so that they pass along the bond planes; and causing crystal re-growth along the bond planes, to form bonds between the individual segments behind the moving molten zone. The invention will usually involve at least four segments, with each region between segments having its own bond region of bond material that will be subjected to a moving zone, where all of the separate zones will have to be moved the same distance in a coordinated manner.

The objects of the invention are also accomplished by a method of bonding together at least two long metal alloy segments of power generating equipment components by: (1) providing a bond material containing a melting point depressant element between long, closely spaced, metal alloy segments; (2) forming a first heated zone along the segments length containing: unmelted alloy, a molten pool of melted alloy, melting alloy, melted bond material, bond material that is solid state diffusing into the unmelted alloy, and resolidifying alloy; and (3) gradually moving the heat zone to additional points along the length of the metal alloy segments to form a bond between the at least two metal alloy segments along their entire length, where adjacent solid and liquid material in the moving heat zone is at the same temperature and the molten pool follows a precise constrained path between the closely spaced segments, and where the composition of the unmelted metal alloy of the segments and the melted resolidified metal alloy of the segments is essentially the same.

The objects of the invention are further accomplished by providing a method of bonding together at least two long single crystal metal alloy segments of turbine components by: (1) inserting a low melting bond material between long single crystal metal alloy segments; (2) spacing the segments close to each other; (3) applying heat at a first point along the length of the segments to form a first point heat zone; (4) forming, within said heat zone, a laterally constrained small, local molten pool between the closely spaced segments at said first point where heat is applied, where said heat zone contains, in coexistence: unmelted segment metal alloy that is below its melting point, melted segment metal alloy, melting segment metal alloy where the melting point of the segment metal alloy has been lowered by the bond material, melted bond material that is solid state diffusing into the unmelted segment metal alloy, and resolidifying segment metal alloy formed due to diffusion of bond material causing the melting point of the resolidifying segment metal alloy to raise; and (5) gradually moving the heat zone to additional points along the length of the metal alloy segments to form a bond between the at least two metal alloy segments along their entire length, where adjacent solid and liquid material in the moving heat zone is at the same temperature and the molten pool follows a precise constrained path between the closely spaced segments, and where the composition of the unmelted metal alloy of the segments and the melted resolidified metal alloy of the segments is essentially the same.

This process utilizes simple casting of slabs or continuous bars for preselected quality single crystal material, for example, CMSX-4, described later in the specification. Complex wall and cooling geometries are machined into the sides of mating sections to provide very complex and high efficiency cooling options. The complex cross-sections are joined to produce a single crystal component by the passage of a moving liquid phase bonding zone which causes local melting and directional, single crystal resolidification of the bond regions by moving the molten zone along individual, parallel, thin bond zones, whereby the molten pools are constrained to be of very small size. The small size of the individual pools allows the local shape and dimensional tolerances of complex cooling features and thin walls to be retained. Control of the resolidification process produces the required single crystal. The approach provides a way to provide very cost effective single crystal components via the use of very cheap methods to produce single crystal material, and a means to incorporate complex features without impairing the ability to produce single crystal quality.

BRIEF DESCRIPTION OF THE DRAWINGS

The above and other advantages of this invention will be more apparent from the following description in view of the drawings where.

DETAILED DESCRIPTION OF THE PREFERRED EMBODIMENTS

Figure 1:
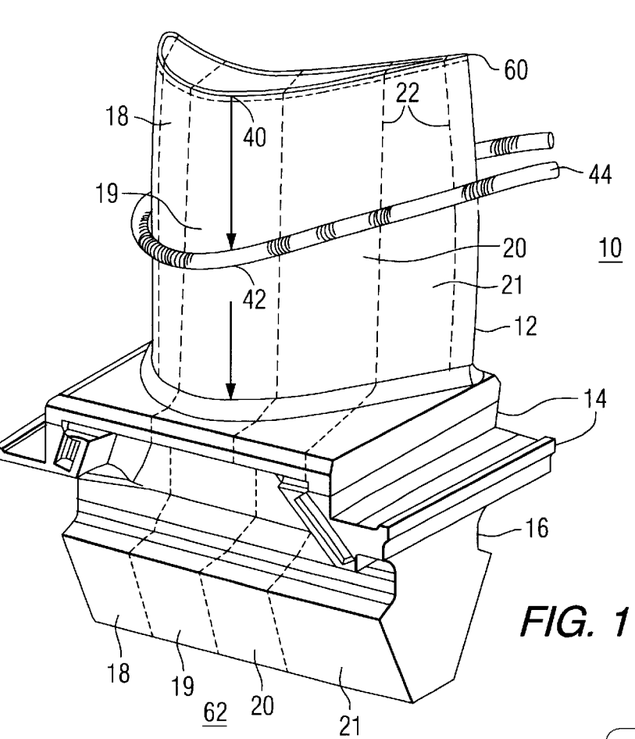
FIG. 1 is a three dimensional perspective view of a single crystal, sandwich turbine blade construction where the broken lines represent directionally processed resolidified bond lines.
Figure 2:
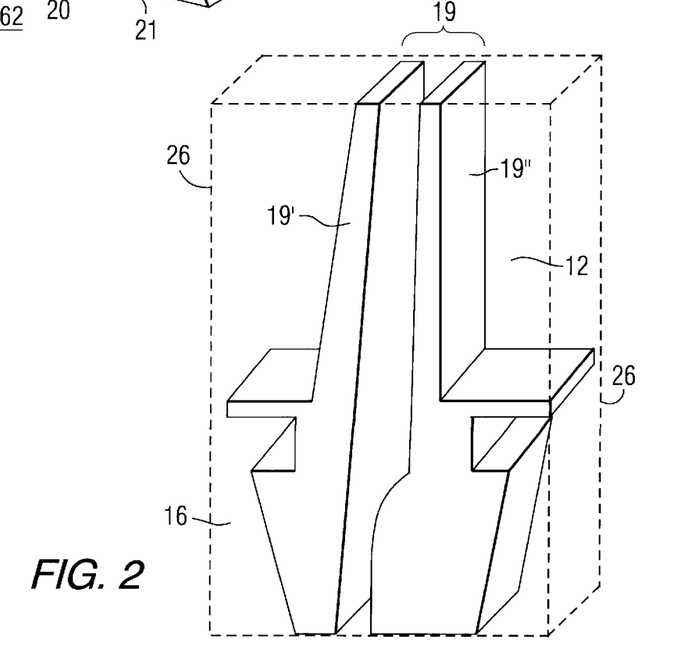
FIG. 2 is a cross section of one segment of the turbine blade of FIG. 1.

Referring now to FIG. 1, a finished turbine blade component 10 is shown with an upper airfoil portion 12 a platform 14 of complex geometry and root portion 16. The blade airfoil, platform and root portions are formed of aligned segments or wafers, for example, 18, 19, 20 and 21, each made of single crystal high temperature superalloy, usually cobalt or nickel based, usually also containing Cr, Al, Ti and Mo, among other component elements, as is well known in the art. Shaw, for example, in U.S. Pat. No. 4,039,330, teaches standard nickel base superalloys having wt % compositional ranges of Cr=22.4–24.0; Co=7.4–15.4; Mo=0.1–3.15; W=1.85–4.0; Nb=0.2–2.0; Ta=1.05–1.7; Ti=2.8–4.3; and Al=1.39–2.19, with minor amounts of C, Zr, and B, with the balance being Ni. Other superalloys include CMSX-4, having approximate wt % compositional ranges of: Al=5.6–6.0; Cr=6.5–6.6; Ti=1.0; Co=7.0–9.65; Mo=0.6–1.0; Ta=6.5–7.0; W-6.4–6.5; Re=2.95–3.0; and Hf=0.0–0.95, with the balance being Ni. This material can be made as a single crystal structure, as described by Harris et al. In U.S. Pat. No. 4,643,782. Nickel-based superalloys are also described in U.S. Pat. No. 5,540,790 (Erikson). Cooling passageways of a variety of configurations, not shown in FIG. 1 usually pass through the root portion 16 to provide fluid coolant entry into cavities within the airfoil portion 12. The broken lines 22 in FIG. 1 represent the directionally processed bond lines between segments. FIG. 2 shows, generally, without the platform detail shown in FIG. 1, a cross section of the two sections 19' and 19" making up for example, segment 19, after machining from an original cast single crystal slab of superalloy shown by dotted lines 26.

The process of this invention employs producing defect-free single crystals in slab form 26 that are machined to form cross-section elements 19' and 19", which are approximately 1.27 cm (0.5 inch) to 2.54 cm (1 inch) thick, and are subsequently bonded to form joined segment 19, as well as other segments, for example, 18, 20 and 21, all of which are bonded to form blade 10, using a moving heat zone. The single crystals slabs 26 are produced in sizes over 0.64 cm (0.25 inch) that are easy to produce in defect free form thereby providing a guaranteed high yield source of single crystal material. The slabs are machine without stress by electrochemical machining, chemical machining, water jet cutting or low stress machining to form not only the outer envelope of the blade segment, but also the internal cooling passages and channels, not shown in FIGS. 1 or 2.

Generally, the slabs are assembled with thin layers of bonding material, typically modifications of the base alloy chemistry 1 wt % to 3 wt % boron addition between the slabs. The bonding material may be in the form of foils or pastes of even electro-deposited films. The assembled blade construction is held in a fixture at room or moderate temperature and a moving heating zone, provided by an induction coil, 44 in FIG. 1, is traversed along the direction of the long axes of, for example, the segments 18, 19, 20 and 21. The heating is controlled to provide local melting and isothermal resolidification of the bonding media between all of the single crystals 18, 19, 20 and 21. The resulting structure is similar to a cast "single crystal" with the regions between the original slabs forming low angle boundaries.

The single crystal slab material, 26 in FIG. 2, is produced in the form of well-controlled, relatively uniformly shaped single crystal sections, for example, slabs 15.2 cm (6 inch)× 7.6 cm (3 inch)×0.94 cm (⅜ in thick) or 20.3 cm (8 inch)×15.2 cm (6 inch)×2.54 cm (1 inch thick). These single crystal sections can be produced by conventional single crystal casting processes wherein discrete sections are cast individually or by modified continuous casting methods. Further methods may be to use the moving zone recrystallization techniques of this invention to prepare long single crystal strips. Thus, this method can also be used to fabricate the starting material slab 26 in long strip form. In such cases the continuous strips can then be sectioned into appropriate length sections for further processing. The strips can be subsequently cleaned, machined and chemically etched to remove extraneous material and deformed metal layers. A key advantage of the availability of the single crystals in this form is that they can be inspected at this stage before any further processing cost are incurred and a determination of the single crystal quality and acceptability can be made.

The single crystal slabs should be approximately uniform in size and shape. It is not necessary that the sections are absolutely rectangular. For instance tapered sections may be produced so that the envelope of the cross-section is adequate to accommodate at one end the greater thickness of the root while at the other end the cross-section is adequate only to accommodate the smaller thickness of the airfoil section, as shown in FIG. 1. Appropriate through thickness dimensions for the slabs are approximately between 0.94 cm (⅜ inch) and 2.54 cm (1 inch) thick depending upon the ability of the casters to cost effectively guarantee single crystal quality. One key factor in the control of the single crystal casting and in the selection of the single crystals is the orientation of the single crystals. Because contiguous single crystals must be bonded to produce consolidated "single crystals" without significant (or "high angle") grain boundaries, both the primary and secondary orientations of the crystals should be controlled. Adequate transverse properties can be delivered by structures in which boundaries up to about 15–20 degrees are tolerated. Single crystal selection should be based upon such criteria.

After single crystal sections have been produced, blade sections can be produced by deformation-free machining. Deformation free machining processes include electro-chemical machining, electro-discharge machining and stress free grinding. FIG. 2 shows such machined sections. The use of such sections allows for the machining of complex internal features, such as the thin wall cooling elements (the open sections and the pins and spars that hold the wall of the central spar), and through section features, such as the cooling passages from the central internal cooling plenums into the thin wall cavity, as shown generally in Hess, U.S. Pat No. 4,302,700.

After the individual sections have been individually machined to the approximate sections and profiles, they must be fitted up and machined more precisely, so that the gaps between adjacent sections are within the tolerances required for the transient bonding, on the order of 0.00254 cm to 0.005 cm (0.001 inch to 0.002 inch). Such precise tolerances can be achieved by either electro-discharge or electrochemical machining of adjacent pieces, both processes being well known. By controlling the machining parameters, very smooth parts that match to within 0.00254 cm (0.001 inch) can be produced.

High precision transient bonding is used to produce high quality chemically and microstructurally homogeneous bonds between the single crystal segments. Parts of the process employed in this invention are similar to that described in the art, in the that very fine chemically matched bond materials are employed (foils of the order of 0.0025 cm to 0.0050 cm (1 mil to 2 mils) thick, chemically matched to the base material and containing an addition of between 1 wt % to 4 wt % Boron ("B") as a melt point suppressant. Compressive fixturing is used to hold the bonding assembly together during processing. The process procedure is, however, very substantially different in that the whole of the joining structure is not isothermally melted and resolidified at the same time, providing substantial advantages.

Figure 3:
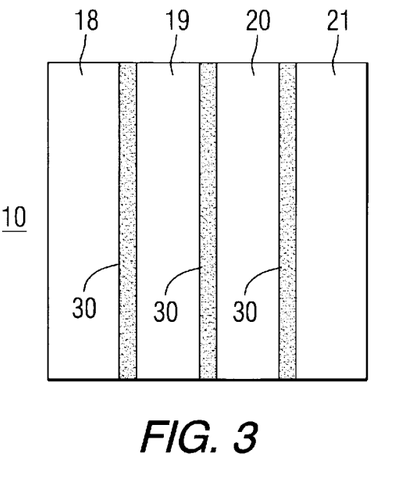
FIG. 3 shows a heat zone at a first point along a turbine blade segment.
Figure 4:
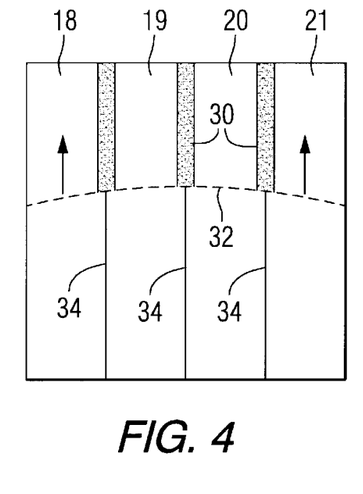
FIG. 4 shows a heat zone at a second point along a turbine blade segment.

One of the key concepts of this invention is that the bonding process is driven by a moving hot zone that traverses the structure to be bonded. In this concept the bonding material is melted locally by a moving molten zone that is traversed along the bonding planes. By controlling the heat input, the local temperature and the speed of traverse, local pools of isothermally melting and solidifying material are formed along each bonding plane. As the hot zone moves it causes melting of the bond foil and this in turn causes local dissolution of the base material. At the back of the molten pool the material solidifies as a single crystal. FIGS. 3 and 4 schematically illustrate the action of the passage of this moving hot zone. Effectively, this process provides several moving molten zones across the section of the component with each molten zone being locally constrained by the adjacent high melting point single crystal material. FIG. 3 shows, for example, segments or wafers, for example, 18, 19, 20 and 21 of turbine blade 10, with bond material 30 therebetween (shown greatly enlarged in cross section) before directional melting and resolidification. FIG. 4 generally shows the same segments and bond material during directional melting and resolidification, showing the front 32 of the heat zone moving in the direction of the arrows, and the bond planes 34 between the closely spaced segments.

Figure 5:
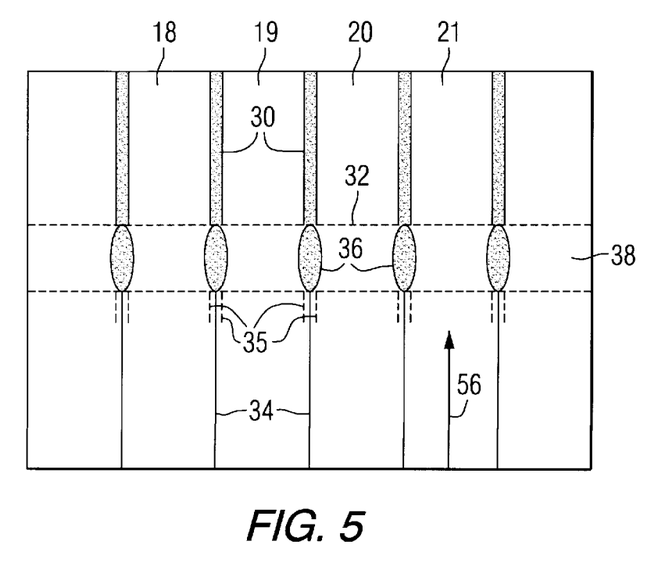
FIG. 5, which best shows the invention, is a schematic representation of the method of this invention.

The motion of such molten zones 32 through a sandwich single crystal/bond medium structure can be accomplished by using local induction heating to augment in-place furnace heating of a part. The directional solidification can be achieved by placing the base of the structure to be bonded on a cold chill structure. FIG. 5 generally illustrates this approach in more detail, showing the molten pools. Note that the process effectively produces local single crystal re-growth 35 along the bonding planes to form bonds 34 using very small liquid pools 36. The bond material 30 is constrained from flowing out of the region by surface tension effects and by the adjacent segments 18, 19, 20 and 21. Thus, quite precise features (wall thickness etc.) can be retained from the original cast and machined single crystal shapes. Complete passage of the molten zone 38 through the bonding structure yields a single crystal component with only minimal low angle boundary (LAB) defects. This process would not be effective in refining a complete section of a blade without local bonds since the molten zone formed in a structure that had uniform material chemistry would be too large to have a surface tension forces to retain its surface shapes, contours and profiles. In such a case the liquid zone would "slump" and the walls' cooling features; and cavities' profiles would be distorted by the processing.

FIG. 1 also illustrates the principles of the disclosed heating process as applied to a blade. The turbine blade component 10 is set in a thermal environment consisting of a furnace hear input and a directional chill. One end of the article to be joined is applied to a chill plate to produce a temperature gradient through the body, in order to aid directional solidification. For convenience, in FIG. 1, the chill 62 is shown as being applied to the root structure 16. Under these conditions the component is held with a temperature gradient along its length. Under these conditions alone the maximum temperature is close, but not sufficient, to the melting point to melt suppressed bond material. The maximum temperature is below the melting point of the cast single crystals since this material melts at a higher temperature than the bonding material. Local heating is then provided at a starting point, generally close to the tip of the blade 40 and then moved down, to point 42 and beyond (as shown by the arrow). When the platform 14 and root 16 are reached, the configuration of the induction coil will be changed to conform to the changed geometry. This heating is most effectively provided by an induction coil, perhaps with additional susceptors inserted inside the central spar structure of the blade if they are free to travel with the induction coil.

The local heating is operated, as shown in FIG. 5, to raise the temperature of a band of material across the cross-section of the blade to a temperature that lies between the melting point of the bond material and that of the base single crystal material. Under these conditions small molten pools of bond material will form in this hotter zone and, because of liquid and solid state diffusion effects, isothermal resolidification will be initiated. The heating source is then moved away from the chill so that solidification is driven from the cooler end of the pool and new melting processes are initiated in the newly heated bond material. Since the solidification at the end of the pool can be controlled to be epitaxial with the base material crystals, well defined single crystals are reproduced upon bond region solidification. Control of the motion of the heat source and the heat flow results in the molten pools being "driven" through the bonding structures, and essentially single crystal structures being produced.

Figure 6:
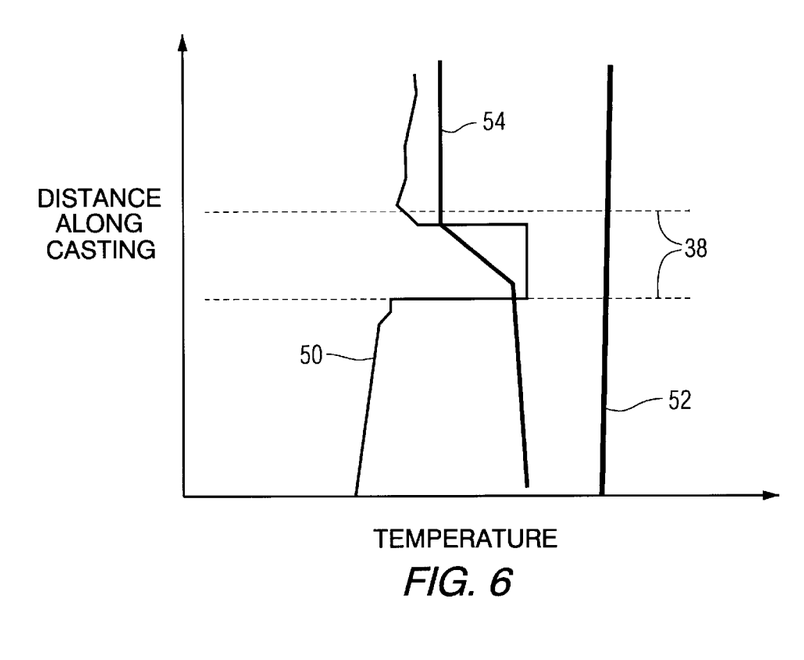
FIG. 6 illustrates temperature distributions along a casting using the method of this invention.

FIG. 6 illustrates the temperature distributions and the melting points of the various material segments that are employed and developed in this process, for example single crystals of CMSX-4. Line 50 is the local temperature in the single crystal segments, for example, 18, 19, 20 and 21 as the process progresses. Line 52 is the melting point in the center of the single crystal segments 18, 19, 20 and 21. The local melting point in the bond zone is shown as 54. The distance along the casting is shown as arrow 56 in FIG. 5.

After the molten zones have been passed through the structures and the bonding material has solidified into the single crystal structure, the structure may have residual regions along the bond planes 34 in which the local melting point may be somewhat depressed. Since the presence of low melting point material may inhibit the use of full solution heat treatments, it is preferable to remove such segregation. To remove such segregation post bond annealing at moderately elevated temperatures will provide diffusion of the melting point suppressant sufficiently to homogenize the melting point of the material to a level close to that of the base material. For example, for one superalloy which is solution heat treated at 1320° C. (2408° F.) and whose incipient melting point is generally only a few tens of degrees higher, heat treating transient liquid phase bonded material at 1232° C. (2250° F.) for 4 hours is sufficient to raise the melting point of the bonded regions to levels that allow the use of the 1320° C. (2408° F.) solution heat treatment without local melting.

Since the local bonding process must be started within the body of the structure, and the base of the structure must be in good thermal contact with the chill zone (shown generally as 62 in FIG. 1), geometric considerations dictate that the single crystals will only be initiated at some finite distance away from the chill zone. Because of this, some sacrificial material, shown as 60 in FIG. 1, must be provided at the tips of the blade sections to lie between the starting point of the zone melting process and the thermal chill. This unbonded material 60 would then be cut off from the casting and discarded after processing. The bonded "sandwich blade" may then be inspected and processed in a similar manner to that proposed for conventional single crystal blades. This process is proposed for the fabrication of airfoils, and full section blades, where the process engineering required to produce the same effects may be modified for each case. Access to the sides of the cast single crystal segments allows for the fabrication of complex cooling passages and thin wall cooling structures.

Figure 7:
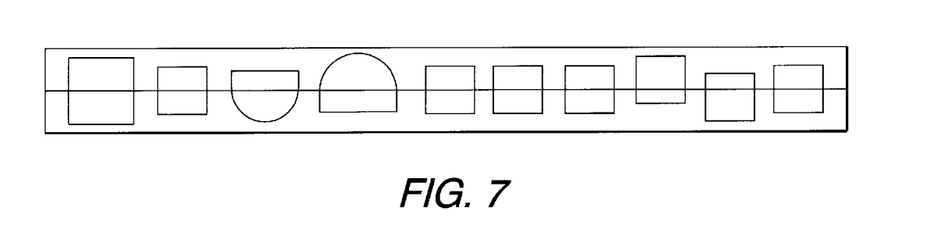
FIG. 7 shows a long joined part.

A thin walled structure can be produced by this method from a two solid sections, by countersinking with machining tools, and then subsequent bonding of the sections to provide a closed wall with a cooling cavity. Such sections cannot usually be made by drilling into a solid body, and casting such sections is very difficult since the "cored casting" technology required cannot guarantee the internal and wall tolerances that are required for high precision components. FIG. 7 shows one example of a front view of such a thin wall structure.

This approach of forming complex cross-sectioned components from cast slabs via local cross-section machining and moving zone based transient liquid phase bonding provides the potential to reliably manufacture complex cross-sections and precise tolerance required single crystal components at a cost that will be greatly reduced compared to single piece casting. By starting with single crystal material in the form of uniform slabs, the process breaks from the conventional paradigm that single crystal quality and the dimensional tolerances can only be assessed after the part has been fully manufactured. Thus, while conventionally, if either single crystal quality or dimensional tolerance had been lacking in a part then the whole of the cost of the part would have been wasted, in this new method single crystal quality and dimensional tolerance are produced separately and in sequence. In this new approach, the costs devoted to developing parts dimensional tolerance are not expended until the single crystal quality has been assured.

The key benefits of the proposed approach are: Allows the use of high yield processes for single crystal castings, which can then be machined for liquid phase bonding, moreover, if constant section size slabs are called for then much cheaper continuous casting techniques could be employed to produce the single crystals themselves. Complex cross-section segments of blades and vanes can be produced with quite intricate cooling passages by machining these passages into the mating surfaces of adjacent segments, thus, much superior cooling systems can be incorporated into single crystal structures that can be achieved by casting using cores or be drilling into solid SC pieces. The cost advantage of the proposed process is expected to be significant especially in the early days of hard cast materials.

Current parts quotations are of the order of $25,000 per "product of mold" casting. Not only will this more efficient process reduce the price multiplier that must be applied to these cast due to (generally much) less than 100% yield, but the potential for using more easy to produce single crystals should be significantly. Machining and moving zone resolidification costs are expected to be much less than the original casting costs, thus the process offers the potential for significantly improved performing critical hot section components at greatly reduced costs.

A typical manufacturing scenario would allow many components to be manufactured out of a standardized, high yield, single crystal plate or slab commodity. Given the 3-D CADD model of the specific component, a computer program could select the sectioning planes and generate a pattern for each layer of component. The computer would also add extra stock length for bond run off and alignment pins, both of which would be removed after bonding. The same program would also create a CMC program file that would narrate the machining operation. All of the layers would be cut from slabs in a manor that would assure perfect crystallographic alignment during the stacking task. A low stress machining operation would then cut each pattern from the plate or slab. The layers would be stacked in order with any necessary bonding material(s) added between layers. The component would then be heated to a temperature just below the solids of the added bonding material (also below the solids of the single crystal alloy). An induction coil would then be used to incrementally melt and bond the component. After bonding the excess material would be parted and the near net shape component would be complete.

Figure 8:
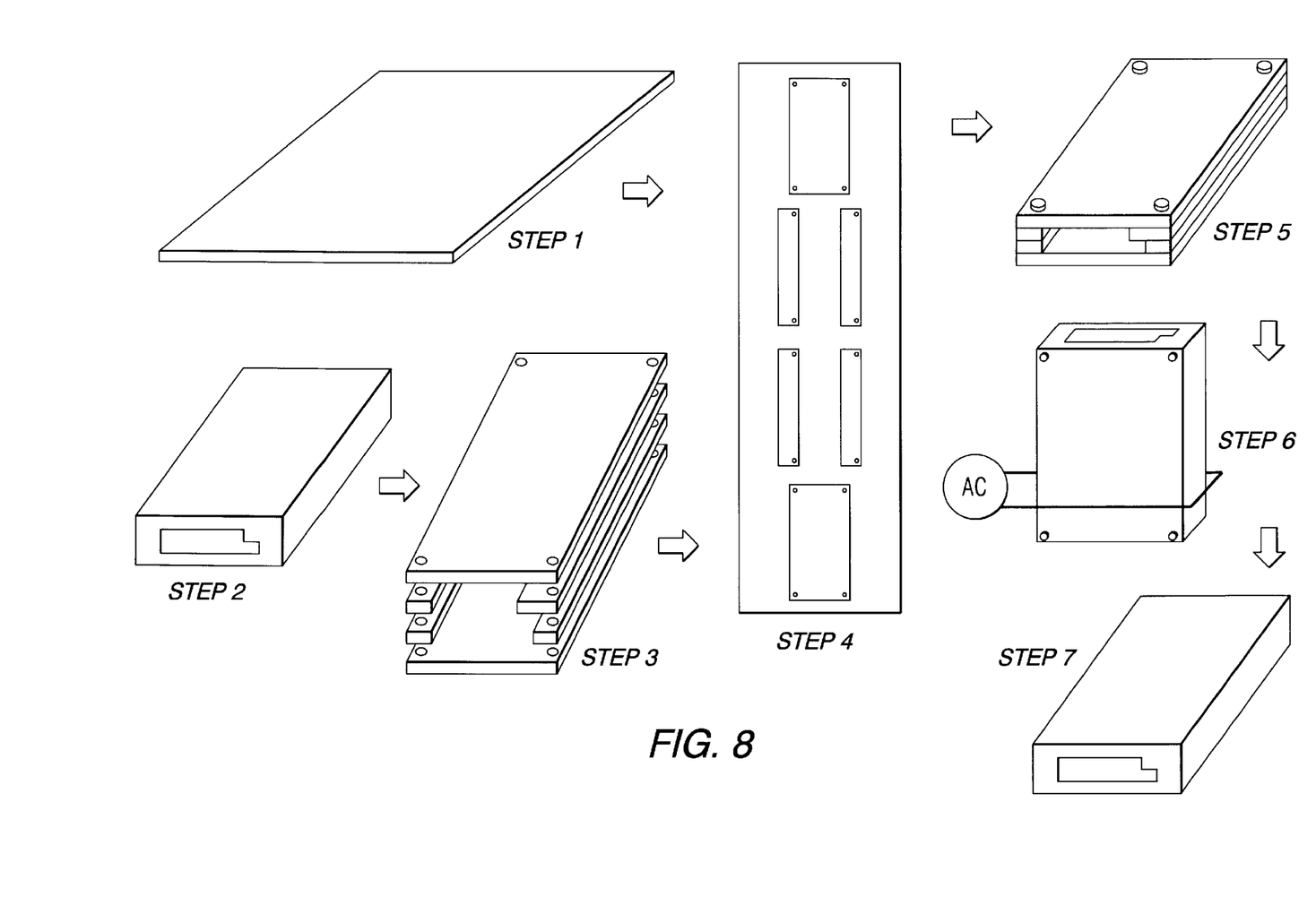
FIG. 8, illustrates a manufacturing process.

FIG. 8 demonstrates one embodiment of a manufacturing process on a hypothetical component. In step 1, a routine casting would be made of a sheet or slab of single crystal. In step 2, a CADD model of the desired part would be generated. In step 3, a computer program would select slice sections and pinning holes. In step 4 actual cut out slices would be made from the single crystal slab cast in step 1. In step 5 a braze/bond would be applied and the stack pinned. In step 6 the pinned stack would be heated according to the method of this invention using an induction coil to provide the final finished part in step 7 where excess material is removed.

It should be understood that the present invention may be embodied in other forms without departing from the spirit or essential attributes thereof, and accordingly, reference should be made to both the appended claims and to the foregoing specification as indicating the scope of the invention.

What is claimed is:

1. A method of bonding together at least two long, metal alloy segments, of turbine components by: putting a melting point depressant between long metal alloy segments at bond planes between contracting segments; forming a heated zone and a heated front across the segments; forming melt pools and a molten zone at the heated front; continuously moving the heated front, melt pools and molten zone so that they pass along the bond planes; and causing crystal re-growth along the bond planes, to form bonds between the individual segments behind the moving molten zone.

2. The method of claim 1, where the segments are single crystal alloys and the melting point depressant contains boron.

3. The method of claim 1, where the method bonds together at least four long segments and where the turbine component is a turbine blade.

4. A method of bonding together at least two long metal alloy segments of power generating equipment components by:
    (1) providing a bond material containing a melting point depressant element between long, closely spaced, metal alloy segments;

(2) forming a first heated zone along the segments length containing: unmelted alloy, a molten pool of melted alloy, melting alloy, melted bond material, bond material that is solid state diffusing into the unmelted alloy, and resolidifying alloy; and (3) gradually moving the heat zone to additional points along the length of the metal alloy segments to form a bond between the at least two metal alloy segments along their entire length, where adjacent solid and liquid material in the moving heat zone is at the same temperature and the molten pool follows a precise constrained path between the closely spaced segments, and where the composition of the unmelted metal alloy of the segments and the melted resolidified metal alloy of the segments is essentially the same.

5. The method of claim 4, where the segments are single crystal alloys.

6. The method of claim 4, where the method bonds together at least four long segments.

7. The method of claim 4, where the heat zones in step (3) are all moved the same distance in a coordinated manner.

8. The method of claim 4, where the long metal alloy segments are turbine blade segments.

9. The method of claim 4, where the melting point depressant in the bond material is boron.

10. The method of claim 4, where the segments are single crystal alloys having approximate wt % compositional ranges of Al=5.6–6.0; Cr=6.5–6.6; Ti=1.0; Co=7.0–9.65; Mo=0.6–1.0; Ta=6.5–7.0; W-6.4–6.5; Re=2.95–3.0; and Hf=0.0–0.95, with the balance being Ni.

11. A method of bonding together at least two long single crystal metal alloy segments of turbine components by:

(1) inserting a low melting bond material between long single crystal metal alloy segments;

(2) spacing the segments close to each other;

(3) applying heat at a first point along the length of the segments to form a first point heat zone;

(4) forming, within said heat zone, a laterally constrained small, local molten pool between the closely spaced segments at said first point where heat is applied, where said heat zone contains, in coexistence: unmelted segment metal alloy that is below its melting point, melted segment metal alloy, melting segment metal alloy where the melting point of the segment metal alloy has been lowered by the bond material, melted bond material that is solid state diffusing into the unmelted segment metal alloy, and resolidifying segment metal alloy formed due to diffusion of bond material causing the melting point of the resolidifying segment metal alloy to raise; and (5) gradually moving the heat zone to additional points along the length of the metal alloy segments to form a bond between the at least two metal alloy segments along their entire length, where adjacent solid and liquid material in the moving heat zone is at the same temperature and the molten pool follows a precise constrained path between the closely spaced segments, and where the composition of the unmelted metal alloy of the segments and the melted resolidified metal alloy of the segments is essentially the same.

12. The method of claim 11, where the method bonds together at least four long segments.

13. The method of claim 11, where the heat zones in step (5) are all moved the same distance in a coordinated manner.

14. The method of claim 11, where the low melting bond material contains boron.

15. The method of claim 11, where the single crystal metal alloy segments are turbine blade segments.

16. The method of claim 11, where the segments are single crystal alloys having approximate wt % compositional ranges of Al=5.6–6.0; Cr=6.5–6.6; Ti=1.0; Co=7.0–9.65; Mo=0.6–1.0; Ta=6.5–7.0; W-6.4–6.5; Re=2.95–3.0; and Hf=0.0–0.95, with the balance being Ni.

* * * * *